United States Patent
Chang et al.

(10) Patent No.: US 6,349,036 B1
(45) Date of Patent: Feb. 19, 2002

(54) ADAPTIVE SEAT OF COMPUTER FUNCTIONAL CARDS

(75) Inventors: Jessica Chang; Chao Jen Wang, both of Taipei (TW)

(73) Assignee: Jess-Link Products Co., Ltd., Taipei (TW)

( * ) Notice: Subject to any disclaimer, the term of this patent is extended or adjusted under 35 U.S.C. 154(b) by 0 days.

(21) Appl. No.: 09/624,985

(22) Filed: Jul. 25, 2000

(51) Int. Cl.[7] ................................................ H05K 7/10
(52) U.S. Cl. ................ 361/730; 361/684; 361/686; 361/733; 361/737; 361/752; 361/756; 361/785; 361/788; 361/729; 439/76.1; 439/928; 439/928.1
(58) Field of Search .................................. 361/683, 684, 361/685, 686, 737, 729, 730, 733, 735, 741, 752, 756, 785, 788, 790, 796, 802, 803; 439/76.1, 928, 928.1

(56) References Cited

U.S. PATENT DOCUMENTS 4,527,285 A * 7/1985 Kekas et al. ................. 439/928
4,595,249 A * 6/1986 Oehlert et al. .............. 439/76.1
6,141,221 A * 10/2000 Tong et al. .................. 351/724
6,285,551 B1 * 9/2001 Brandenburg et al. ...... 361/733

* cited by examiner

Primary Examiner—Jayprakash N. Gandhi
Assistant Examiner—John B. Vigushin
(74) Attorney, Agent, or Firm—Rosenberg, Klein & Lee

(57) ABSTRACT

A computer functional card adapting seat comprises a base and at least one computer functional card. The base has a circuit substrate therein; At least one terminal slot is formed in the circuit substrate. Each terminal slot is connected to a circuit control unit of the circuit substrate. At least one universal serial bus inserting hole, a first inserting hole for being supplied with DC power, and a second inserting hole for being connected to a computer are installed on the base. The universal serial bus inserting hole, and first and second inserting holes are connected to the circuit control unit. Thereby, the computer functional card is formed on the base for being communicated to a computer without needing to detach the case of the computer mainframe.

8 Claims, 7 Drawing Sheets

ADAPTIVE SEAT OF COMPUTER FUNCTIONAL CARDS

FIELD OF THE INVENTION

The present invention relates to a computer functional card adapting seat, and especially to an adapting seat which is directly communicated to a computer functional card (such as audio cards and network cards).

BACKGROUND OF THE INVENTION

If the prior art computer functional cards 60, 70 (such as audio cards, network cards, etc) are to be connected to a computer, the mainframe 80 of the computer must be detached in order for the cards to be installed in the expanding slots 82 in a mother board 81. Therefore, it is very inconvenient.

Therefore, there is an eager demand for an adaptive seat of a computer functional card for solving the defect in the prior art.

SUMMARY OF THE INVENTION

Accordingly, the primary object of the present invention is to provide an adapting seat for a computer functional card for being directly communicated to a computer without needing to detach the case of the computer mainframe. The adaptive seat of a computer functional card comprises a base and at least one computer functional card. The base has a circuit substrate therein; At least one terminal slot is formed in the circuit substrate. Each terminal slot is connected to a circuit control unit of the circuit substrate. At least one universal serial bus inserting holes, a first inserting hole for being supplied with DC power, and a second inserting hole for being connected to a computer are installed on the base. The universal serial bus inserting hole, and first and second inserting holes are connected to the circuit control unit. Thereby, the computer functional card is formed on the base for being communicated to a computer without needing to detach the case of the computer mainframe.

Another object of the present invention is to provide an adaptive seat of a computer functional card, wherein a plurality of universal serial bus inserting holes are formed on the base for being connected to the adaptive seat of other computer functional card so as to achieve the object of expanding the computer functional card.

The various objects and advantages of the present invention will be more readily understood from the following detailed description when reading in conjunction with the appended drawing.

DETAILED DESCRIPTION OF THE PREFERRED EMBODIMENTS

Figure 1:
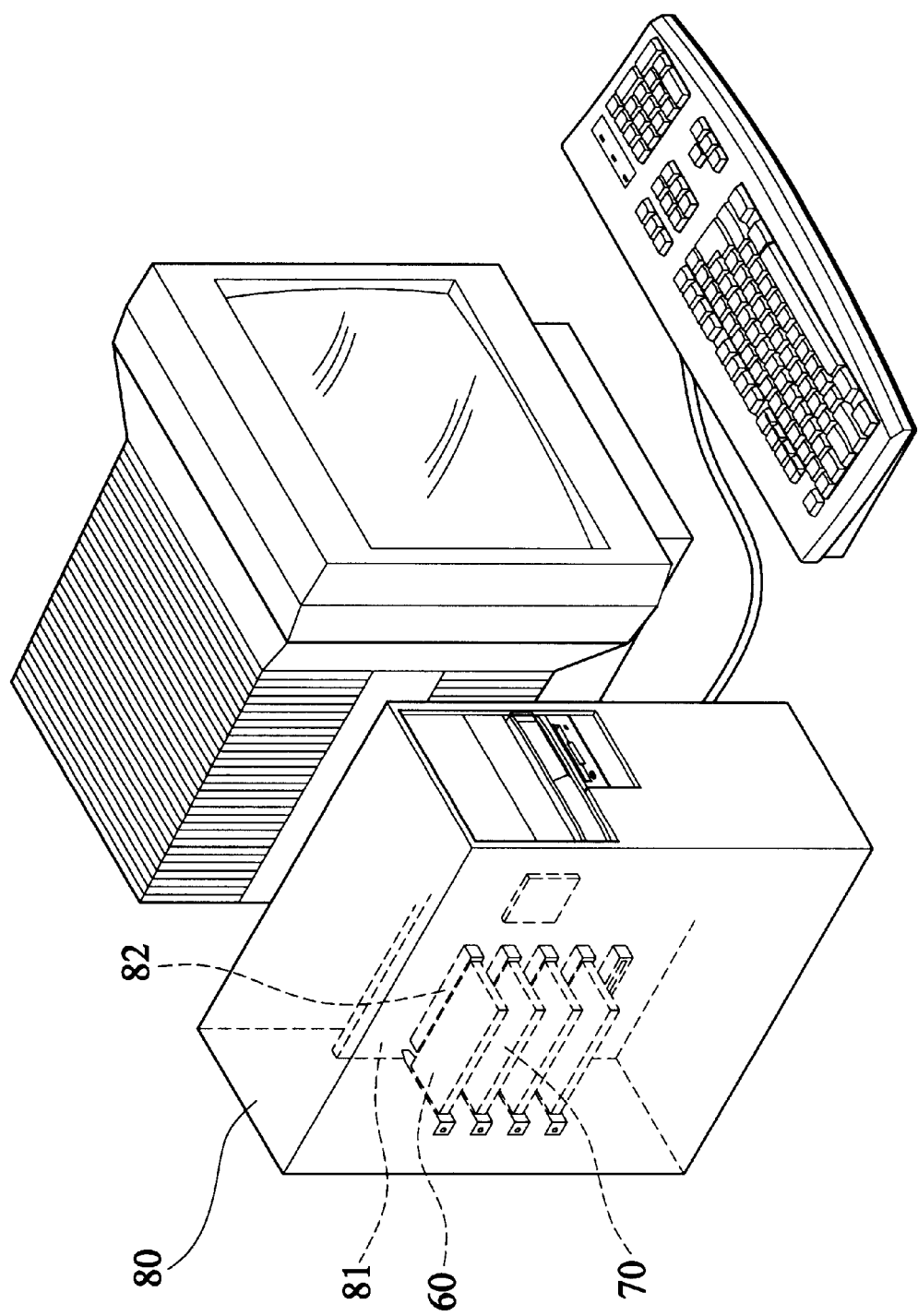
FIG. 1 is a perspective view of a prior art.
Figure 2:
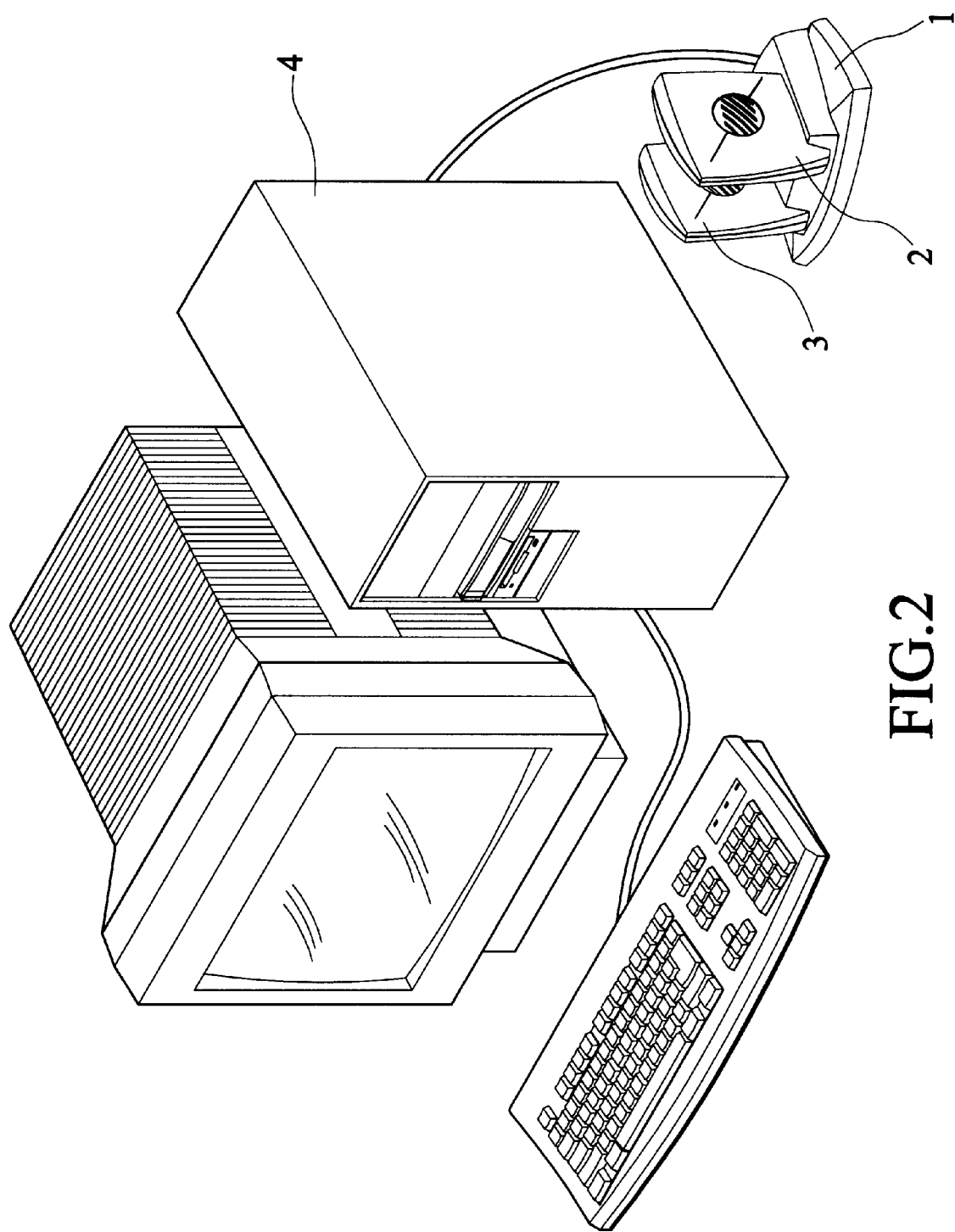
FIG. 2 is a perspective view of the present invention.
Figure 3:
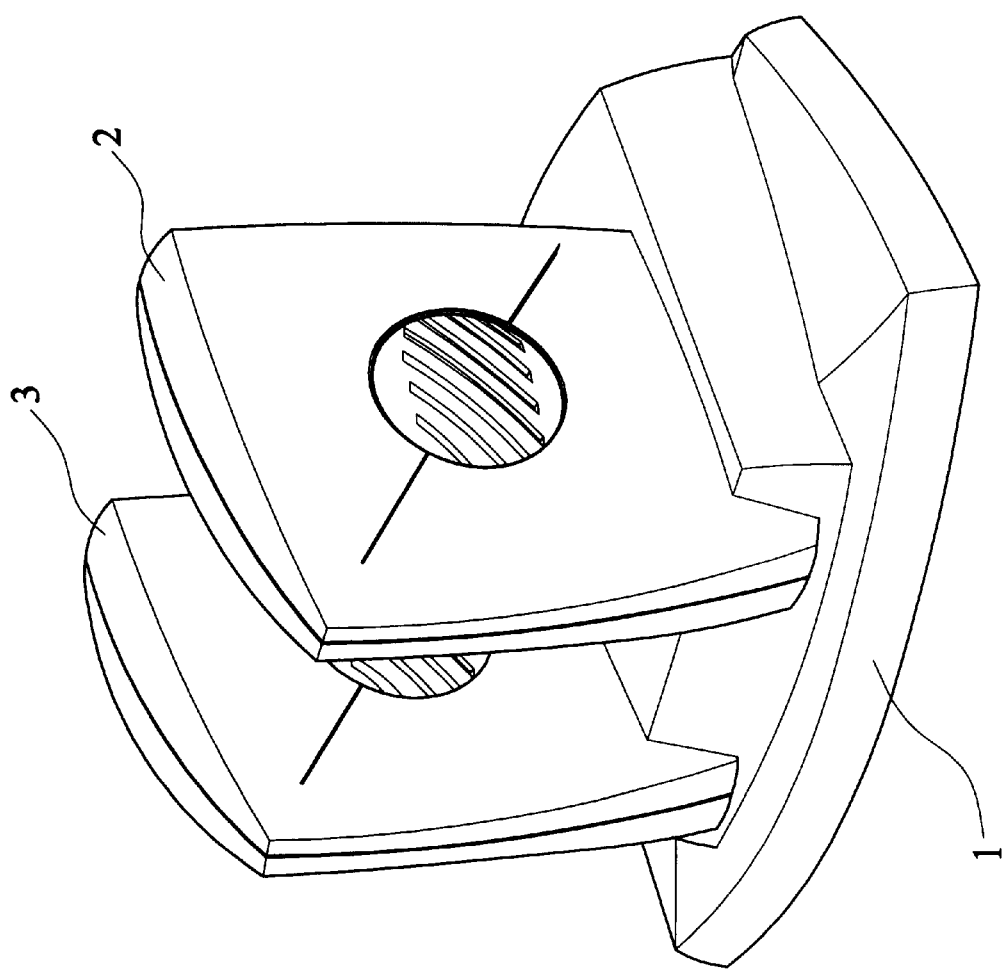
FIG. 3 is a perspective view of the adaptive seat of a computer functional card in the present invention.
Figure 4:
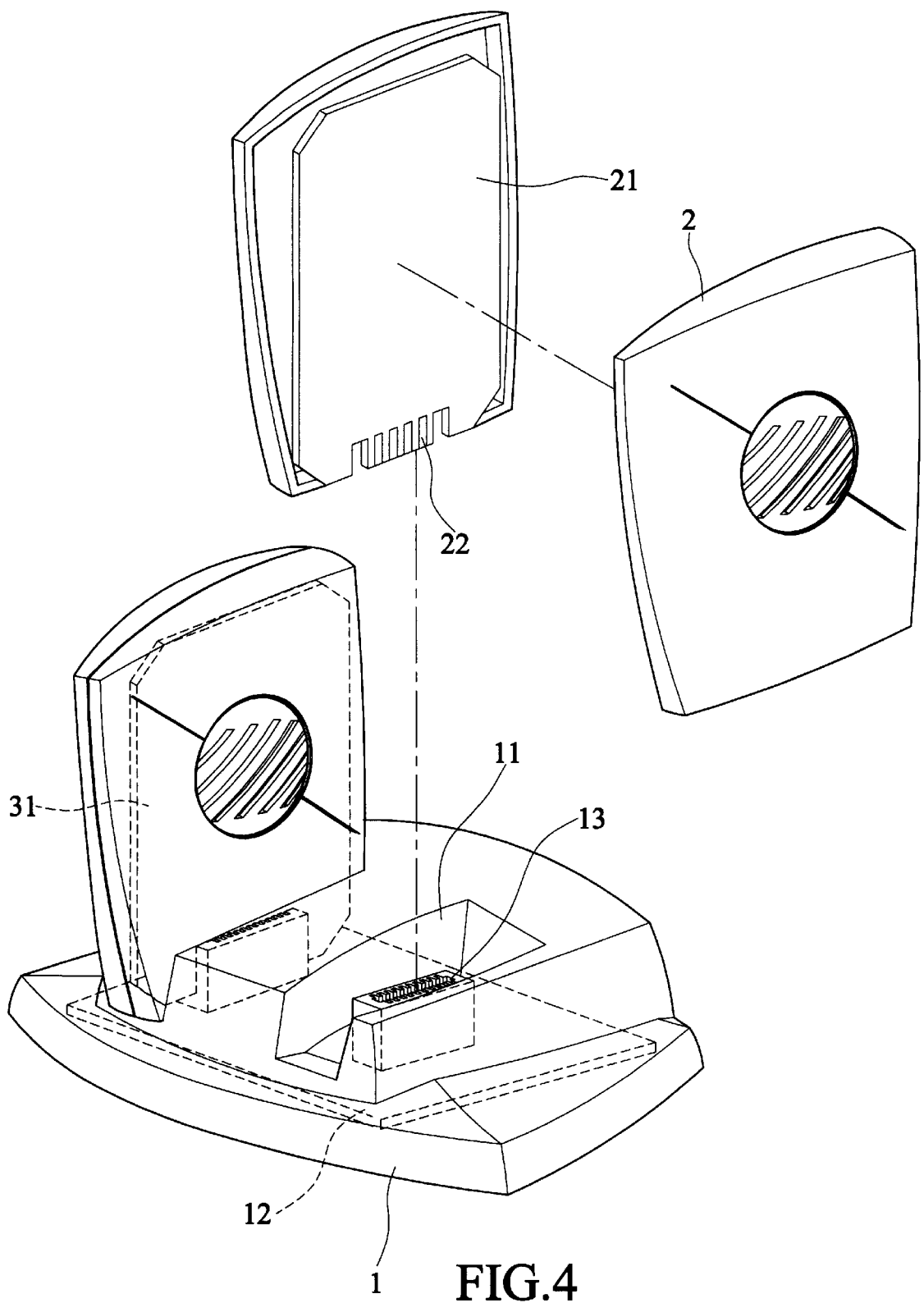
FIG. 4 is an exploded view of the adaptive seat of a computer functional card in the present invention.
Figure 5:
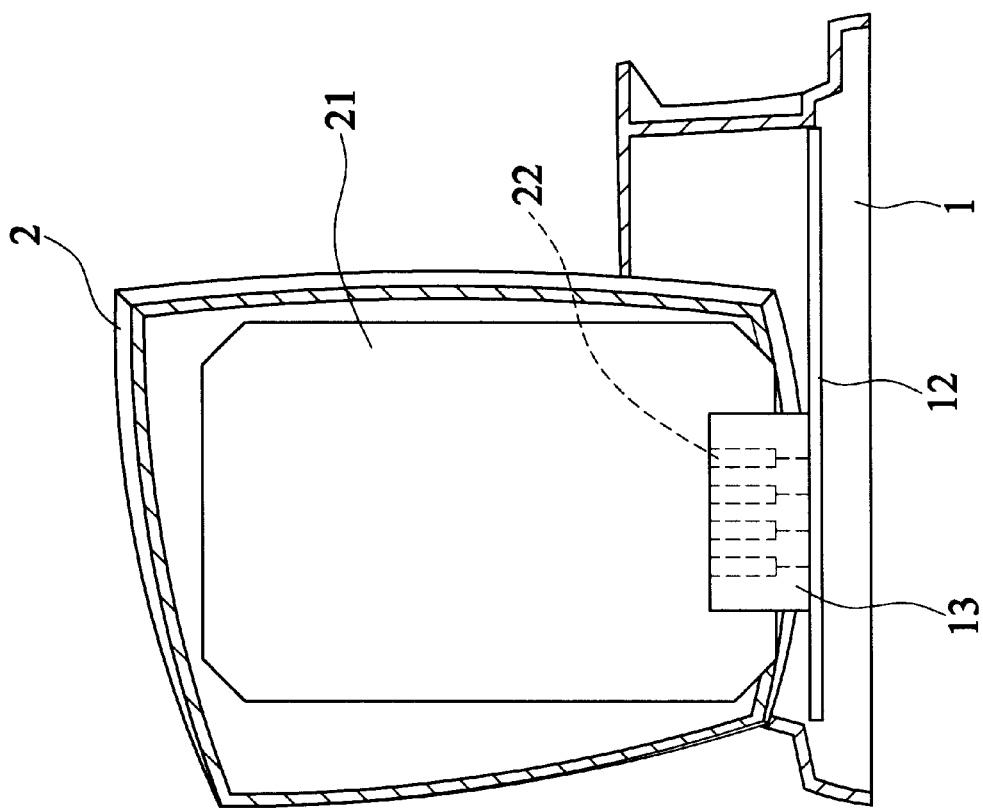
FIG. 5 is a cross sectional view of the adaptive seat of a computer functional card in the present invention.
Figure 6:
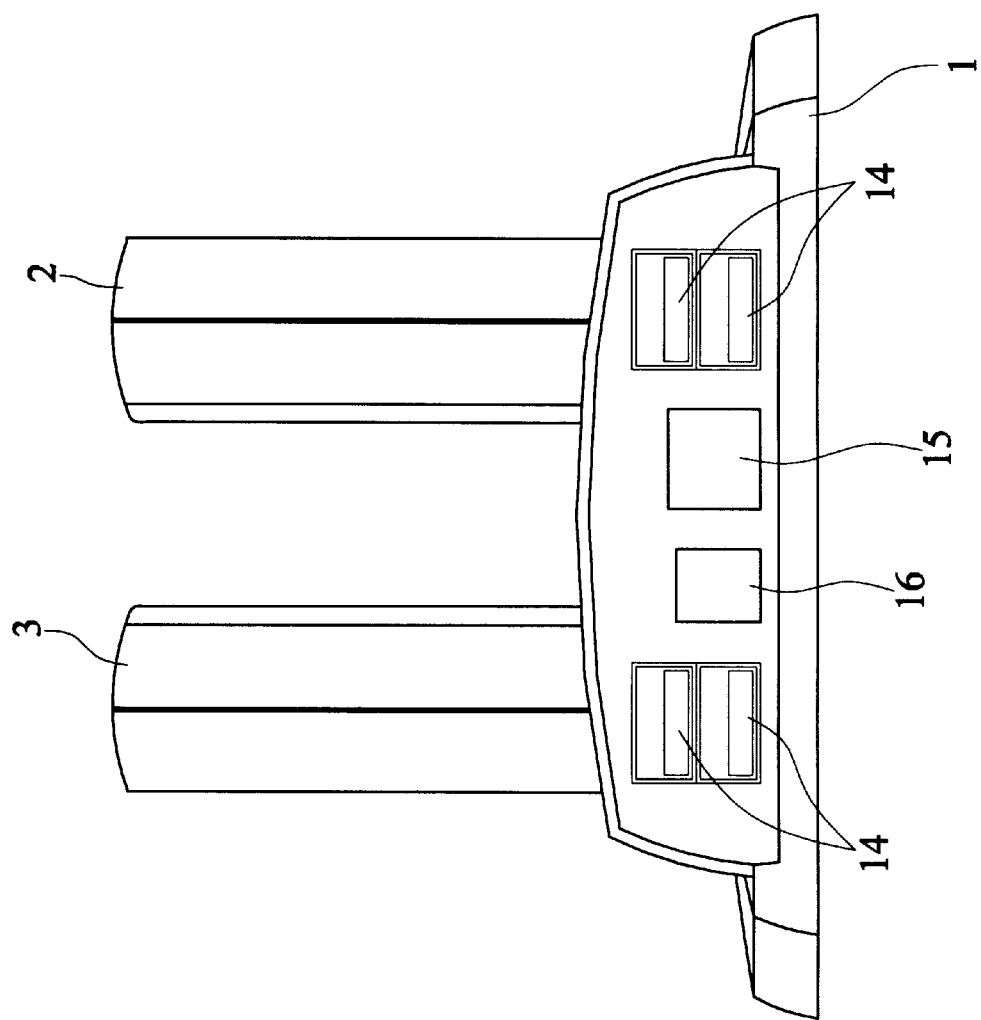
FIG. 6 is a lateral view of the adaptive seat of a computer functional card in the present invention.

With reference to FIGS. 2 to 6, the adaptive seat of a computer functional card of the present invention is illustrated. The adaptive seat of a computer functional card includes a base 1 and a computer functional card seat (in this embodiment includes an audio card seat 2 and a network card seat 3) and other components.

Two guide grooves 11 retained with a proper gap are installed on the base 1. A circuit substrate 12 is installed in the base 1. Two terminal slots 13 are installed on the circuit substrate 12. Each terminal slot 13 is connected to the circuit control unit (hub circuit control unit) of the circuit substrate 12 and is exposed in the guide groove 11. At the rear lateral surface of the base 1, a plurality of universal serial bus inserting holes 14, a first inserting hole 15 for being supplied with DC power, and a second inserting hole 16 for being connected to a computer 4. The universal serial bus inserting hole 14, and the first and second inserting holes 15 and 16 are connected to the circuit control unit.

The audio card seat 2 is embedded in a respective terminal slot 13. An audio card 21 is installed therein. The lower end of the audio card 21 is formed with an insertion portion 22 for being connected the terminal slot 13 so that the audio card 21 is communicated with the circuit unit on the base 1.

The network card seat 3 is embedded to a respective terminal slot 13. A network card 31 is installed therein. The lower end of the network card 31 is installed with an inserting portion (not shown) for being connected to the terminal slot 13 so that the network card 31 is communicated with the circuit unit of the base 1.

Thereby, the computer functional card can be directly embedded into the guide groove 11 of the base 1 and thus is communicated with the computer 4.

Figure 7:
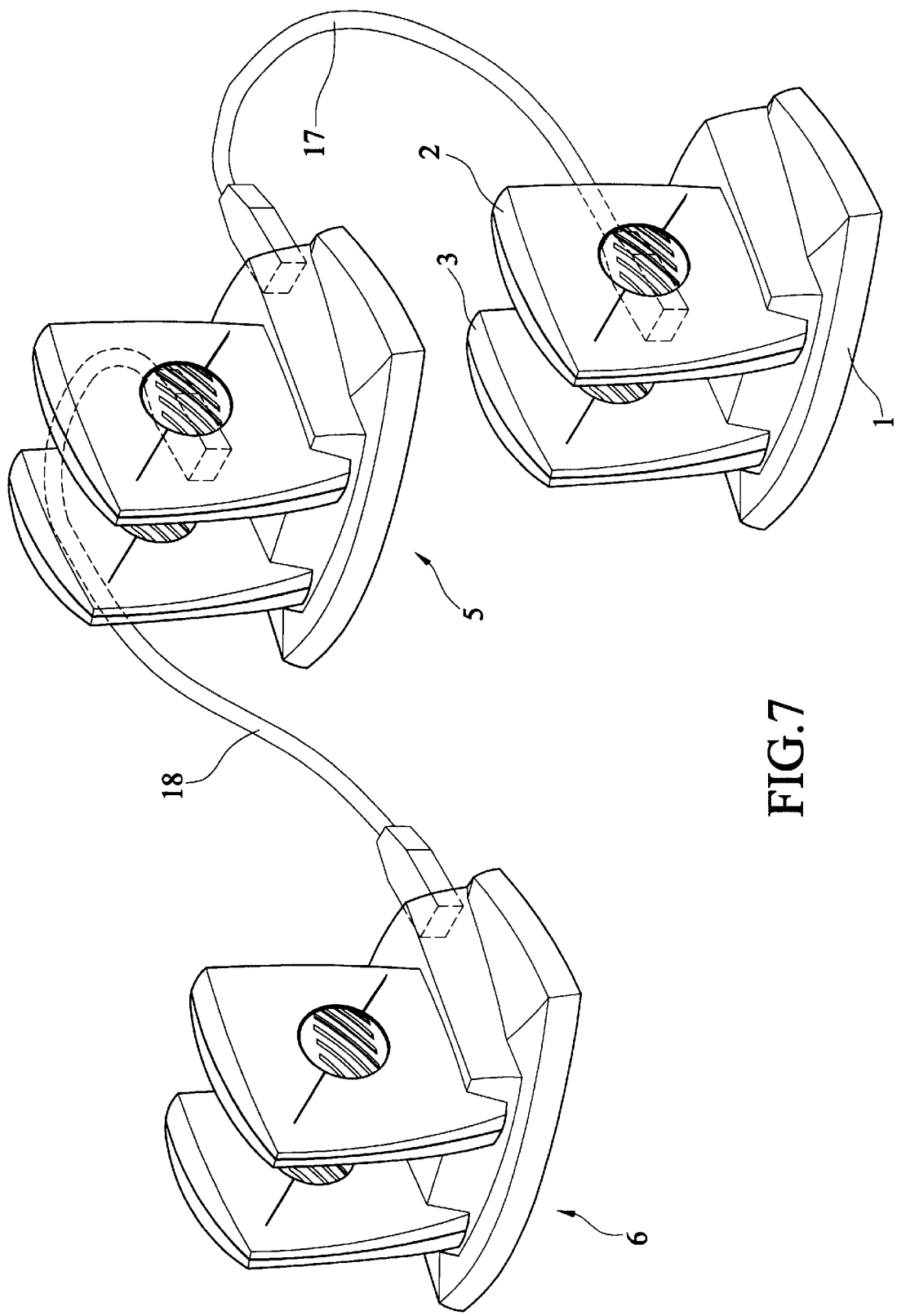
FIG. 7 shows one embodiment about the application of the present invention.

Referring to FIG. 7, in the present invention, the universal serial bus inserting hole 14 can be serially connected to the functional adapting seat 5 of a second computer. The universal serial bus of the functional adapting seat 5 of the second computer may be serially connected to a third adapting seat 6 by a signal wire. Similarly, the other structure is connected as that described above. Therefore, the object of expanding the computer functional cards is achieved.

In summary, by the design of the present invention, the following advantages are achieved.

1. The computer functional card can be connected without needing to detach the housing of a computer.

2. By connecting the adaptive seats of computer functional cards in series, the computer functional cards can be expanded.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A computer functional card expansion system comprising:
   (a) at least one base unit including:
      (1) a housing having a bottom portion and an upper portion formed thereon, said bottom portion defining a compartment, said upper portion having at least one guide groove formed therein to extend at least partially over and communicate with said bottom portion compartment;

(2) a control circuit board disposed within said bottom portion compartment;

(3) at least one terminal slot member mounted to said control circuit board to extend into one said guide groove; and, (4) a plurality of connection devices coupled to said control circuit board and disposed within said housing, said connection devices including respective devices for power, computer, and Universal Serial Bus connections to said base unit;

(b) at least one card seat releasably seated within said guide groove, said card seat defining a card compartment and an opening communicating therewith; and, (c) at least one functional card of predetermined type captured within said card compartment of said card seat, said functional card having a connection edge extending through said card seat opening to engage said terminal slot member of said base unit.

2. The computer functional card expansion system as recited in claim 1 comprising a plurality of said card seats and said functional cards.

3. The computer functional card expansion system as recited in claim 2 wherein said upper portion of said base unit housing has formed therein a plurality of said guide grooves, said base unit including a plurality of said terminal slot members respectively inserting into said guide grooves.

4. The computer functional card expansion system as recited in claim 1 wherein at least one said functional card is an audio card.

5. The computer functional card expansion system as recited in claim 1 wherein at least one said functional card is a network card.

6. The computer functional card expansion system as recited in claim 1 wherein said control circuit board of said base unit includes hub control circuitry.

7. The computer functional card expansion system as recited in claim 1 wherein said base unit includes a plurality of said Universal Serial Bus connection devices disposed on a rear side portion of said base unit housing.

8. The computer functional card expansion system as recited in claim 1 comprising a plurality of said base units coupled in cascade, each said base unit having at least one said card seat and functional card coupled thereto.

* * * * *